(12) United States Patent
Liu et al.

(10) Patent No.: US 9,125,063 B2
(45) Date of Patent: Sep. 1, 2015

(54) METHOD AND APPARATUS FOR TRANSFORMING WORKING MODE IN COGNITIVE RADIO SYSTEM

(75) Inventors: Xing Liu, Shenzhen (CN); Nan Zhao, Shenzhen (CN); Feng Li, Shenzhen (CN); Yan Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 105 days.

(21) Appl. No.: 13/991,104

(22) PCT Filed: Nov. 15, 2011

(86) PCT No.: PCT/CN2011/082233
§ 371 (c)(1),
(2), (4) Date: May 31, 2013

(87) PCT Pub. No.: WO2012/075877
PCT Pub. Date: Jun. 14, 2012

(65) Prior Publication Data
US 2013/0260780 A1   Oct. 3, 2013

(30) Foreign Application Priority Data

Dec. 9, 2010   (CN) .......................... 2010 1 0581580

(51) Int. Cl.
*H04W 72/00* (2009.01)
*H04W 16/14* (2009.01)

(52) U.S. Cl.
CPC .................................... *H04W 16/14* (2013.01)

(58) Field of Classification Search
CPC ..... H04W 16/02; H04W 16/04; H04W 16/06; H04W 16/10; H04W 16/12; H04W 16/14; H04W 28/08; H04W 72/00; H04W 72/04; H04W 72/0426; H04W 72/0453; H04W 72/06; H04W 72/082; H04W 72/085; H04W 72/12; H04W 72/1231; H04W 72/0486; H04W 72/0493; H04W 72/08; H04W 72/10; H01L 27/0006

USPC .......... 370/465, 468, 329, 437; 455/450, 451, 455/452.1, 452.2, 453, 454
See application file for complete search history.

(56) References Cited

U.S. PATENT DOCUMENTS

| | | | |
|---|---|---|---|
| 7,146,176 B2 * | 12/2006 | McHenry | ....................... 455/454 |
| 2007/0213046 A1 * | 9/2007 | Li et al. | .......................... 455/425 |

(Continued)

FOREIGN PATENT DOCUMENTS

| | | | |
|---|---|---|---|
| CN | 1882158 A | 12/2006 | |
| CN | 101141771 A | 3/2008 | |

(Continued)

OTHER PUBLICATIONS

International Search Report in international application No. PCT/CN2011/082233, mailed on Mar. 1, 2012. (2 pages).

(Continued)

*Primary Examiner* — Rafael Pérez-Gutiérrez
*Assistant Examiner* — Mark G Pannell
(74) *Attorney, Agent, or Firm* — Oppedahl Patent Law Firm LLC (57) ABSTRACT

The disclosure discloses a method and an apparatus for transforming a working mode in a Cognitive Radio (CR) system, which are used for solving the technical problem that a subsystem maliciously occupies the spectrum resources which are temporarily unused by other system in a system adopting a CR technology. In the disclosure, a network side measures the demand degree of each cell on borrowed spectrum and sets a conditions of enabling and disabling the CR working mode to determine whether to perform working mode transformation on the cell and specify a network allocation method for a mobile terminal in a corresponding working mode, so as to coordinate the allocation of the spectrum resources, and avoid the abuse of the borrowed spectrum resources; the CR working mode of the cell with low demand degree is disabled by the network side; the borrowed spectrum resources of the cell are released; and therefore, more borrowed spectrum resources are available to the other cells having a higher demand degree on the borrowed spectrum, and the overall performance of the system is improved.

14 Claims, 5 Drawing Sheets

(56) References Cited

U.S. PATENT DOCUMENTS

| | | | |
|---|---|---|---|
| 2008/0170539 A1* | 7/2008 | Hyon et al. | 370/328 |
| 2008/0170603 A1* | 7/2008 | Hyon et al. | 375/214 |
| 2009/0117914 A1* | 5/2009 | Kwon et al. | 455/454 |
| 2009/0141662 A1 | 6/2009 | Gurney et al. | |
| 2010/0081449 A1* | 4/2010 | Chaudhri et al. | 455/452.2 |
| 2010/0128701 A1* | 5/2010 | Nagaraja | 370/338 |
| 2010/0197317 A1* | 8/2010 | Sadek et al. | 455/452.2 |
| 2011/0007645 A1* | 1/2011 | Tompson et al. | 370/252 |
| 2011/0194503 A1* | 8/2011 | Stanforth | 370/329 |
| 2011/0228666 A1* | 9/2011 | Barbieri et al. | 370/216 |
| 2011/0237238 A1* | 9/2011 | Hassan et al. | 455/422.1 |
| 2012/0063373 A1* | 3/2012 | Chincholi et al. | 370/281 |
| 2013/0155991 A1* | 6/2013 | Kazmi et al. | 370/329 |

FOREIGN PATENT DOCUMENTS

| | | |
|---|---|---|
| CN | 101541010 A | 9/2009 |
| CN | 101662327 A | 3/2010 |
| CN | 101909303 A | 12/2010 |
| JP | 2010171662 A | 8/2010 |
| WO | 2009110103 A1 | 9/2009 |

OTHER PUBLICATIONS

English Translation of the Written Opinion of the International Search Authority in international application No. PCT/CN2011/082233, mailed on Mar. 1, 2012. (9 pages).

\* cited by examiner

Fig. 6

METHOD AND APPARATUS FOR TRANSFORMING WORKING MODE IN COGNITIVE RADIO SYSTEM

TECHNICAL FIELD

The disclosure relates to the technical field of wireless communications and Cognitive Radio (CR), in particular to a method and an apparatus for transforming a working mode of a subordinate cell or a base station of a CR system.

BACKGROUND

Along with the continuous progress of radio technology, a large number of various radio serves have emerged. However, spectrum resources on which radio services depend are limited; facing the increasing demand from people on bandwidth, spectrum resources show an extremely strained situation, while in a conventional fixed spectrum allocation mode, the utilization rate of spectrum resources is not high. Improving the utilization rate of spectrum resources becomes a main means for solving a contradiction between increased demand and limited resources, which is also a core idea of CR technology.

The improvement of the spectrum utilization rate can be realized by waiting for an opportunity to occupy the spectrum resources (such as TV White Spaces (TVWS)) which are temporarily unused by authorized services in other frequency bands. The spectrum resources which are temporarily unused by other systems are borrowed to share part of wireless communication services with a spectrum-strained cell, which undoubtedly can ease the spectrum-strained situation of the wireless communication service of the cell; however, if the borrowing from a subsystem is not limited, malicious spectrum occupation may probably occur. For example, when a plurality of systems occupy a certain section of spectrum resources which are temporarily unused by an authorized service in a shared way, each system hopes to acquire borrowed spectrum resources as much as possible, thus malicious application for occupation is transmitted; and if a spectrum borrowing rule is not proposed for different interest regions in a single system, malicious application for occupation of borrowed spectrum resources may also occur; in this way, part of systems or cells, even when their spectrum resources are not strained, may occupy relatively more borrowed spectrum resources, and the systems or cells with strained spectrum are likely to obtain rare borrowed spectrum resources.

SUMMARY

In view of the above, the main purpose of the disclosure is to provide a method and an apparatus for transforming a working mode in a CR system. The method and the apparatus are used for solving the technical problem that a subsystem maliciously occupies spectrum resources which are temporarily unused by other systems in a system adopting the CR technology.

In order to achieve the purpose, the technical scheme of the disclosure is implemented in the following way:

A method for transforming a working mode in a CR system includes:

measuring, by a network side, a demand degree of each subordinate cell on borrowed spectrum resources;

judging, by the network side, whether the demand degree of each subordinate cell on borrowed spectrum resources meets a condition for working mode transformation, and determining whether to perform working mode transformation on each cell according to a judgement result; and notifying, by the network side, a base station to execute a network allocation policy of a mobile terminal in a corresponding working mode.

The demand degree on borrowed spectrum resources may be represented by traffic and communication quality of the subordinate cell; and the working modes may include a normal working mode and a CR working mode, wherein the CR working mode refers to a working mode of working at a system authorized spectrum and a borrowed spectrum at the same time, and the normal working mode refers to a working mode of working at a system authorized spectrum.

Further, when the demand degree on borrowed spectrum resources is represented by the traffic of the cell, a remaining capacity threshold value interval may be set, and the condition for working mode transformation may be that: when an absolute value of system remaining capacity or a relative value of the system remaining capacity to system capacity is greater than an upper limit of a corresponding preset remaining capacity threshold value interval, the CR working mode is transformed into the normal working mode; and when an absolute value of a system remaining capacity or a relative value of the system remaining capacity to system capacity is less than a lower limit of a corresponding preset remaining capacity threshold value interval, the normal working mode is transformed into the CR working mode.

Further, when the demand degree on borrowed spectrum resources is represented by the communication quality, a communication quality threshold value interval may be set, the condition for working mode transformation may be that: when the communication quality is less than a lower limit of the communication quality threshold value interval, the normal working mode is transformed into the CR working mode; and when the communication quality is greater than an upper limit of the communication quality threshold value interval, the CR working mode is transformed into the normal working mode.

Further, the executing a network allocation policy of a mobile terminal in a corresponding working mode specifically may include:

when the CR working mode is transformed into the normal working mode, a base station commends a mobile terminal which has accessed a borrowed spectrum in a region to switch to an authorized spectrum of the system, and a mobile terminal newly entering the subordinate cell accesses an authorized spectrum of the system; and when the normal working mode is transformed into the CR working mode, a mobile terminal newly entering the subordinate cell preferentially accesses the borrowed spectrum after the CR working mode is enabled.

On the basis of the method, the disclosure also provides an apparatus for transforming a working mode in a CR system, wherein the apparatus includes:

a measurement module configured to acquire and measure a demand degree of each subordinate cell on borrowed spectrum resources;

a judgement module configured to judge whether the demand degree of each subordinate cell on borrowed spectrum resources meets a condition for working mode transformation, and determine whether to perform working mode transformation on each cell according to a judgement result; and an execution module configured to execute a network allocation policy of a mobile terminal in a corresponding working mode according to a determination result of the judgement module.

The demand degree of the subordinate cell on borrowed spectrum resources acquired by the measurement module may be represented by traffic or communication quality of the subordinate cell; and the working mode comprises a normal working mode and a CR working mode, wherein the CR working mode refers to a working mode of working at a system authorized spectrum and a borrowed spectrum at the same time, and the normal working mode refers to a working mode of working at a system authorized spectrum.

Further, when the demand degree of the subordinate cell on borrowed spectrum resources is represented by the traffic of the subordinate cell, a remaining capacity threshold value interval may be set, and the condition for working mode transformation may be that: when an absolute value of system remaining capacity or a relative value of the system remaining capacity to system capacity is greater than an upper limit of a corresponding preset remaining capacity threshold value interval, the CR working mode is transformed into the normal working mode; and when an absolute value of a system remaining capacity or a relative value of the system remaining capacity to system capacity is less than a lower limit of a corresponding preset remaining capacity threshold value interval, the normal working mode is transformed into the CR working mode.

Further, when the demand degree of the subordinate cell on borrowed spectrum resources is represented by the communication quality, a communication quality threshold value interval may be set, and the condition for working mode transformation may be that: when the communication quality is less than a lower limit of the communication quality threshold value interval, the normal working mode is transformed into the CR working mode, and when the communication quality is greater than an upper limit of the communication quality threshold value interval, the CR working mode is transformed into the normal working mode.

Further, the network allocation policy of the mobile terminal in the corresponding working mode, which is executed by the execution module, may include:

when the CR working mode is transformed into the normal working mode, a base station commends a mobile terminal which has accessed a borrowed spectrum in a region to switch to an authorized spectrum of the system, and a mobile terminal newly entering the subordinate cell accesses an authorized spectrum of the system; and when the normal working mode is transformed into the CR working mode, a mobile terminal newly entering the subordinate cell preferentially accesses the borrowed spectrum after the CR working mode is enabled.

In the disclosure, the network side measures the demand degree of each cell on the borrowed spectrum and sets the conditions of enabling and disabling the CR working mode to determine whether to perform working mode transformation on the cell and specify a network allocation method for the mobile terminal in a corresponding working mode, so as to coordinate the allocation of the spectrum resources. The disclosure has the advantages as follows: 1. the allocation of the borrowed spectrum resources is coordinated, and the abuse of the borrowed spectrum resource is avoided; and 2. the CR working mode of the cell with low demand degree is disabled by the network side, and the borrowed spectrum resources of the cell are released, so that more spectrum resources which can be borrowed are available to the other cells having a higher demand degree on the borrowed spectrum, and the overall performance of the system is improved.

DETAILED DESCRIPTION

The basic idea of the disclosure is that: when spectrum resources unused by other systems are occupied by utilizing CR technology, a system measures the demand degree of a subordinate cell of the system on borrowed spectrums and sets conditions of enabling and disabling a CR working mode of a BS to judge whether to perform working mode transformation on the subordinate cell of the CR system and specify a network allocation method for a mobile terminal in a corresponding working mode, so as to coordinate the allocation of spectrum resources. The disclosure focuses on limiting the conditions of enabling and disabling a CR working mode of a subordinate cell of a CR system; considering from the aspect of the overall network, a system releases borrowed spectrum resources by disabling the CR working mode of a cell with low traffic, so that more spectrum resources which can be borrowed are available to other cells with high traffic, and the overall performance of the system also can be improved.

In order to make the purpose, the technical scheme and the advantages of the disclosure more clear, the disclosure is described below with reference to the embodiments and the accompanying drawings in detail.

Figure 1:
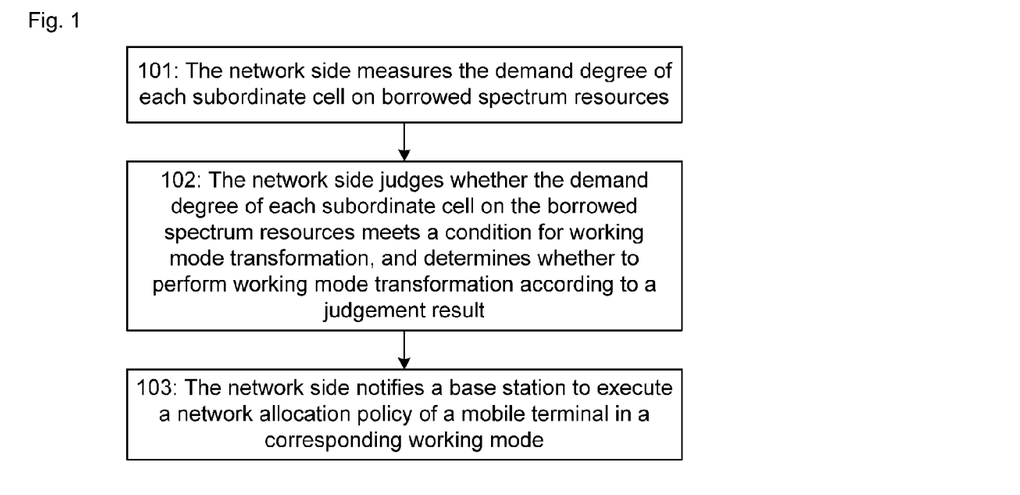
FIG. 1 shows steps of transforming a working mode of a BS and steps of network allocation of a mobile terminal of the disclosure.

FIG. 1 shows a step flow chart of the method of the disclosure, wherein the method specifically includes the following steps.

Step 101: a network side measures a demand degree of its subordinate cell on borrowed spectrum resources;

the basis of measuring the demand degree can be the traffic and the communication quality (including, but not limited to parameters such as call drop rate, Bit Error Rate (BER) and Block Error Rate (BLER)) of each cell, and parameters which can indicate the demand degree of a communication cell on a borrowed spectrum.

Step 102: the network side judges whether the demand degree of each cell on borrowed spectrum resources meets a condition for working mode transformation, and determines whether to perform working mode transformation on each cell according to a judgement result.

The working mode comprises a normal working mode and a CR working mode, wherein the CR working mode refers to a working mode of working at a system authorized spectrum and a borrowed spectrum at the same time, and the normal working mode refers to a working mode of working at a system authorized spectrum.

The CR working mode enabling condition is a condition required to be met by the demand degree when a cell or a BS is transformed into the CR working mode from the normal working mode. After entering the CR working mode and when the demand degree meets the CR working mode disabling condition, the BS is transformed into the normal working mode.

The CR working mode enabling and disabling condition is directly related to a demand degree parameter:

when the network side measures the demand degree of a cell on a borrowed spectrum by traffic, a remaining capacity threshold value interval for inhibiting frequent transformation is set; the less the system remaining capacity is, the greater the current load is, and the higher the demand degree is. Measuring the demand degree of the subordinate cell on borrowed spectrum resources refers to: counting traffic of the subordinate cell in a time period to obtain an absolute value of system remaining capacity or a relative value of the system remaining capacity to system capacity; and judging, by the network side, whether the demand degree of the subordinate cell on borrowed spectrum resources meets a condition for working mode transformation refers to: setting a system remaining capacity threshold value interval (which is between the upper and lower limits of the system remaining capacity); when the absolute value of the system remaining capacity or the relative value of the system remaining capacity to the system capacity is greater than the upper limit of a corresponding preset system remaining capacity threshold value interval, the CR working mode is transformed into the normal working mode; when the absolute value of the system remaining capacity or the relative value of the system remaining capacity to the system capacity is less than the lower limit of a corresponding preset system remaining capacity threshold value interval, the normal working mode is transformed into the CR working mode.

The system remaining capacity is a difference value between the system capacity and the current traffic; and the relative value of the system remaining capacity to the system capacity is the ratio of the system remaining capacity to the system capacity.

When the network side takes the communication quality as a measurement parameter of the demand degree, a communication duality threshold value interval for inhibiting frequent transformation is set; the worse the communication quality is, the higher the demand degree is. Measuring the demand degree of the subordinate cell on borrowed spectrum resources refers to: counting the parameters of communication quality of the subordinate cell in a time period; and judging, by the network side, whether the demand degree of the subordinate cell on borrowed spectrum resources meets a condition for working mode transformation refers to: setting a communication quality threshold value interval (which is between upper and lower limits of the communication quality); when the communication quality is less than the lower limit (namely the third threshold) of the communication quality threshold value interval, the normal working mode is transformed into the CR working mode; when the communication quality is greater than the upper limit (namely the fourth threshold) of the communication quality threshold value interval, the CR working mode is transformed into the normal working mode.

Step 3, the network side notifies the BS to executes a network allocation policy of a mobile terminal in a corresponding working mode.

Figure 2:
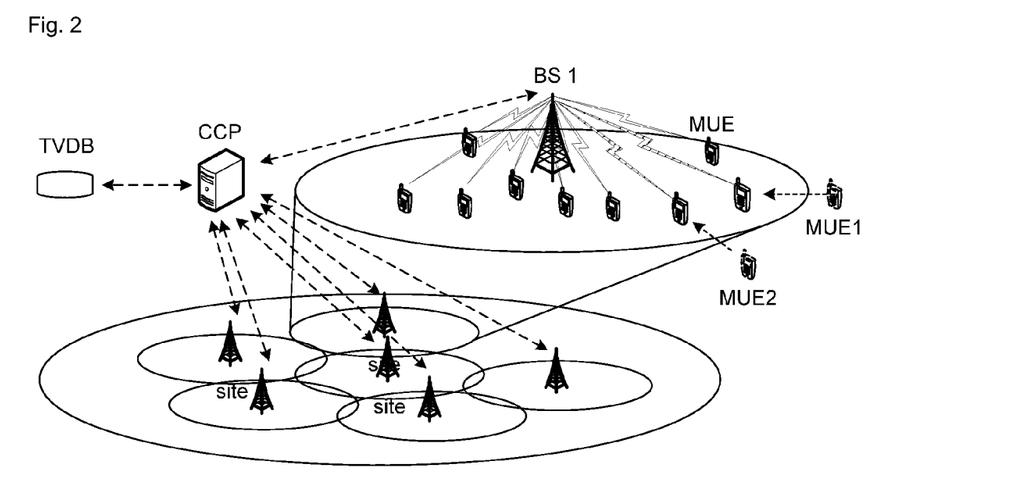
FIG. 2 shows a schematic diagram of an application scene of the disclosure.

FIG. 2 shows a schematic diagram of an application scene in an example taking TVWS (TV White Spaces) as spectrum resources borrowed by a system of the disclosure, wherein the application scene mainly involves the entities of: a TV Database (TVDB), a Central Control Point (CCP), a BS, and Mobile User Equipment (MUE), wherein the CCP controls a plurality of base stations, and each BS controls a plurality of pieces of MUE. The entities involved in the scene are described below:

TVDB: the TVDB can be provided by a TV operator and a third party; the contents of the TVDB are the utilization situation of TV spectrum (frequency channels) used by TV operators in local region or a plurality of regions including local region, namely, 1, the state of the spectrum (frequency channels) which is being used includes but is not limited to: a frequency channel number, bandwidth, possible duration, D/U requirement ($R_{D/U}$ is the power ratio of an available signal expected by a TV receiver to an interfering signal), a spectrum mask, coverage, an isolation strip and other information; 2, the state of a unused spectrum (frequency channels) includes but is not limited to: a frequency channel number, working bandwidth, coverage, possible duration, and allowed maximum transmitting power and other information; and 3, the information of frequency channels which are not allowed to be used (which may be a management domain restricted frequency channel, an operator reserved frequency channel or the like) includes but is not limited to: a frequency channel number, working bandwidth and other information.

CCP: the CCP is fixedly connected with the TVDB, and the functions of the CCP include but are not limited to: 1. acquiring the traffic of each cell; 2. judging whether its subordinate cell meets the CR working mode enabling condition according to a preset condition; 3. controlling a base station of its subordinate cell to enable or disable the CR working mode; 4. accessing the TVDB and acquiring TVWS information; 5. allocating available TVWS spectrum resources to an access link of the cell in the CR working mode; and 6. storing information about TVWS utilization of the system.

BS: the BS is fixedly connected with the CCP, and the functions of the CCP include but are not limited to: 1. reporting the traffic of a cell to the CCP; 2. after entering the CR working mode, applying for TVWS resources for its subordinate access link; 3. allocating obtained TVWS spectrum resources to the access link of its subordinate mobile terminal and adjusting the spectrum resources used by the access link according to the update of the TVWS information; 4. executing a network allocation policy of the mobile terminal in a corresponding mobile terminal; and 5. working at an authorized frequency band and a TV frequency band at the same time.

MUE: the MUE communicates with the BS (an access link is formed), and the functions of the MUE include and are not limited to: 1. supporting working at an original authorized frequency band and a TV frequency band; and 2. adjusting a working frequency point and a frequency band.

Figure 3:
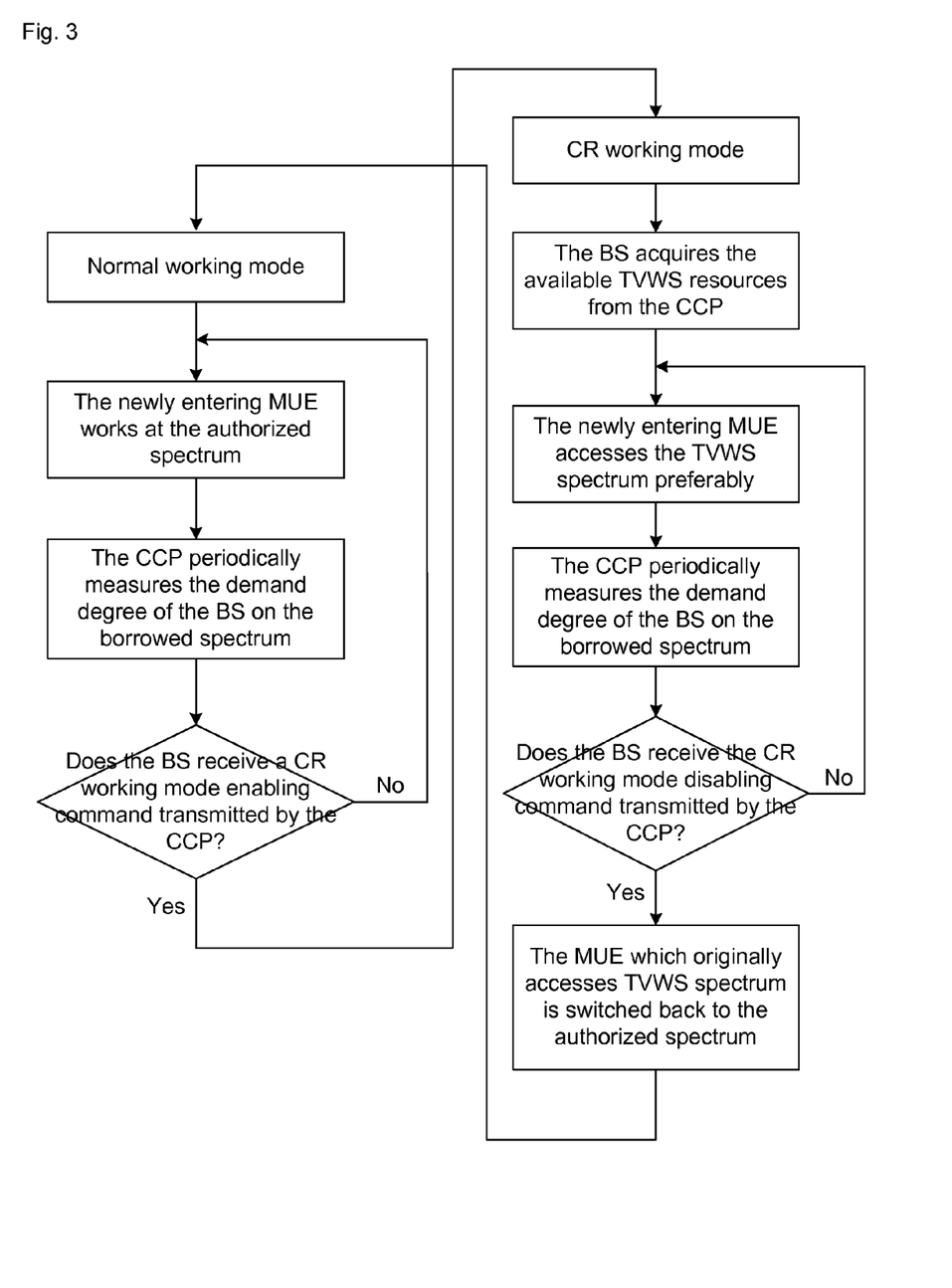
FIG. 3 shows a flow chart of working mode transformation of a CR system of the disclosure.

FIG. 3 shows a flow chart of base station working mode transformation and mobile terminal network allocation taking the scene shown in the FIG. 2 as an example. A base station works in the normal working mode in a default situation; a newly entering MUE works at an authorized spectrum in the normal working mode; the CCP acquires the demand degree of each BS on a borrowed spectrum periodically, for example, the traffic or the communication quality are taken as the measurement parameter of the demand degree; when the demand degree reaches or exceeds a preset threshold, the CCP indicates the BS to enable the CR working mode, otherwise, the newly entering MUE is still accessed into the originally authorized spectrum. In the CR working mode, the CCP acquires TVWS information from the TVDB, allocates available TVWS spectrum resources to an access link of a cell in the CR working mode; when a newly entering MUE exists, the BS allocates the TVWS spectrum for the newly entering MUE preferably. In the CR working mode, the CCP measures the demand degree of the BS on the borrowed spectrum periodically; when the demand degree is lower than the preset threshold, the CCP indicates the BS to disable the CR working mode; and if there is still an MUE occupying the TVWS spectrum, then the MUE which originally accesses to the TVWS spectrum is switched back to the authorized spectrum.

Embodiment 1 of the Method

Figure 4:
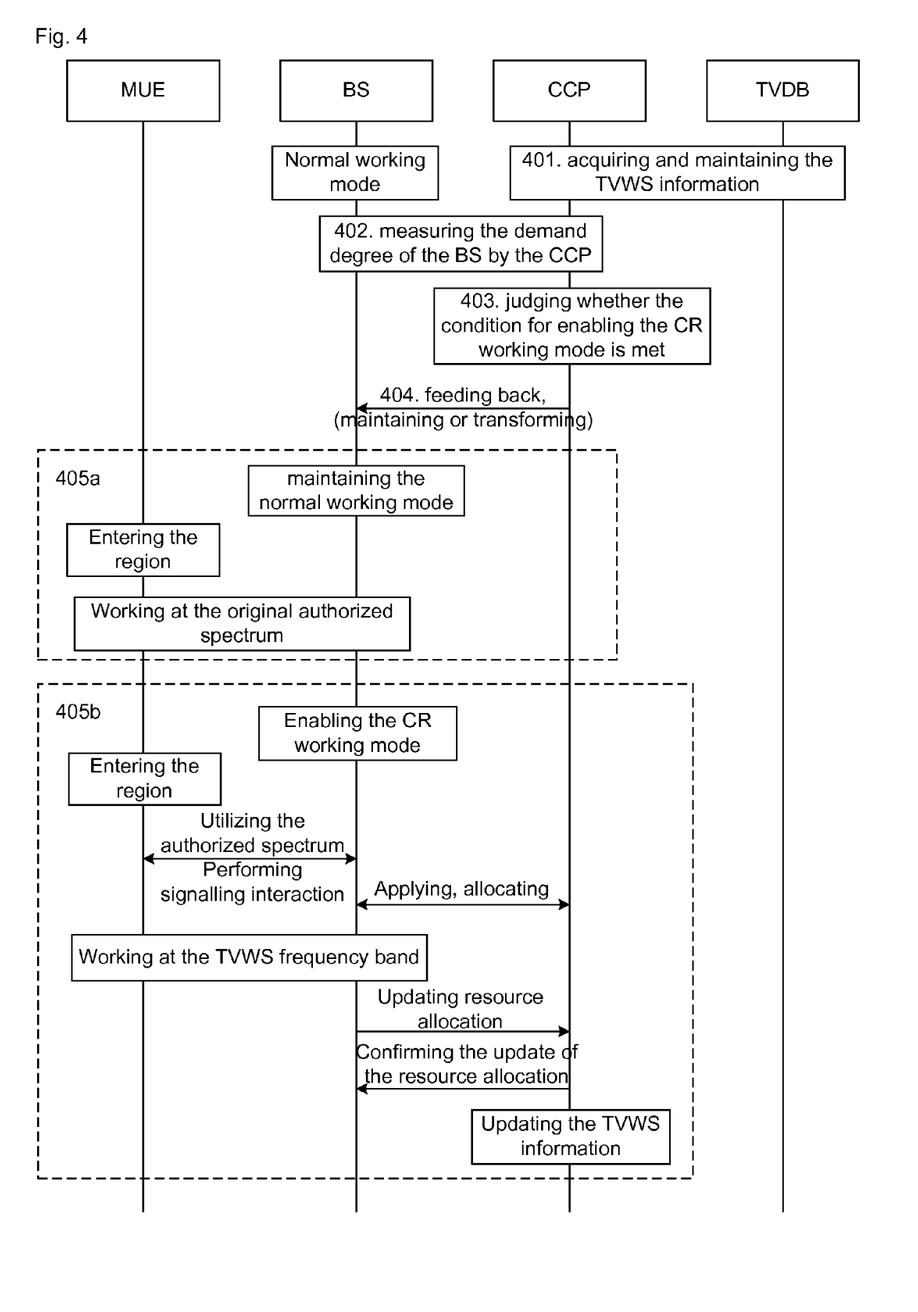
FIG. 4 shows a signalling enabling flow of a CR working mode of the disclosure.

As shown in FIG. 4, the method for enabling a CR working mode in a CR system of the embodiment is specially described below.

Step 401: in the normal working mode, the CCP acquires and maintains TVWS information;

the manner of acquiring and maintaining TVWS information by the CCP can be: visiting a TVDB periodically or as required, or notifying the CCP by the TVDB when TVWS information changes; and in addition, the CCP stores information about the TVWS utilization situation of the system at the same time. The operation is performed all the time during the normal operation of the CCP, so that the CCP allocates TVWS spectrum resources which are indeed available currently to the BS after the subordinate BS enters the CR working mode.

Step 402: the CCP measures the demand degree of the BS on the borrowed spectrum;

the parameters for the CCP to measure the demand degree of the BS can be the traffic and the communication quality of a cell where the BS is located, and other parameters which can represent the demand degree of the communication cell on a borrowed spectrum.

Step 403: the CCP judges whether to enable the CR working mode by comparing a demand degree measurement result and a preset CR working mode enabling condition of the system;

when the CCP measures the demand degree of the cell on a borrowed spectrum by the traffic, the CR working mode enabling condition is the lower limit of the remaining capacity threshold value interval, and can be set as the absolute value of the system remaining capacity (for example, the remaining bandwidth is 100 kHz) or the relative value of the system remaining capacity to the system capacity (for example, the system remaining capacity occupies 10% of the system capacity) and the like. When the absolute value of the current system remaining capacity or the relative value of the system remaining capacity to the system capacity is less than the lower limit of the preset remaining capacity threshold value, the base station enables the CR working mode. Under this condition, the traffic is used for measuring the current load state of the cell; the heavier the load is, the higher the demand degree is, and finally the demand degree of the cell on the borrowed spectrum is determined.

When the CCP takes the communication quality as the measurement parameter of the demand degree, the CR working mode enabling condition is the upper limit of the communication quality threshold value interval, and can be set as a call drop rate, a BER, a BLER and other parameters for measuring the communication quality of the cell (for example, the drop call rate is set as 0.1); and when the current call drop rate of the cell is higher than the set condition, the base station enables the CR working mode. Under this condition, the worse the communication quality is, the higher the demand degree is, whether the CR working mode is required to be enabled is measured by the communication quality, and communication is performed by borrowing other system spectrum.

Step 404: the CCP feeds back a judgement result to the BS, wherein the judgement result comprises a command for maintaining the current working mode or transforming a working mode by the BS;

Step 405: the BS determines a working mode according to the command from the CCP, and executes a network accessing policy of the MUE in a corresponding mode.

405*a*: when the BS receives the command for maintaining the current working mode from the CCP, the BS maintains the normal working mode, and the newly entering MUE accesses the system authorized spectrum.

405*b*: when the BS receives the command for transforming the working mode of the CCP, the BS will perform working mode transformation (if the current working mode is the normal working mode, the mode is transformed into an enabled CR working mode), and after the CR working mode is enabled, the newly entering MUE accesses the TVWS frequency band preferably, specifically: the MUE accesses a BS coverage region, and reports capacity information by using the original authorized spectrum; the BS applies to the CCP for TVWS spectrum resources; the BS allocates obtained TVWS spectrum resources to an access link between the newly entering MUE and the BS; and after the success of configuration, the BS transmits TVWS utilization information to the CCP, and the CCP replies acknowledgment information and updates the stored TVWS utilization information.

Embodiment 2 of the Method

Figure 5:
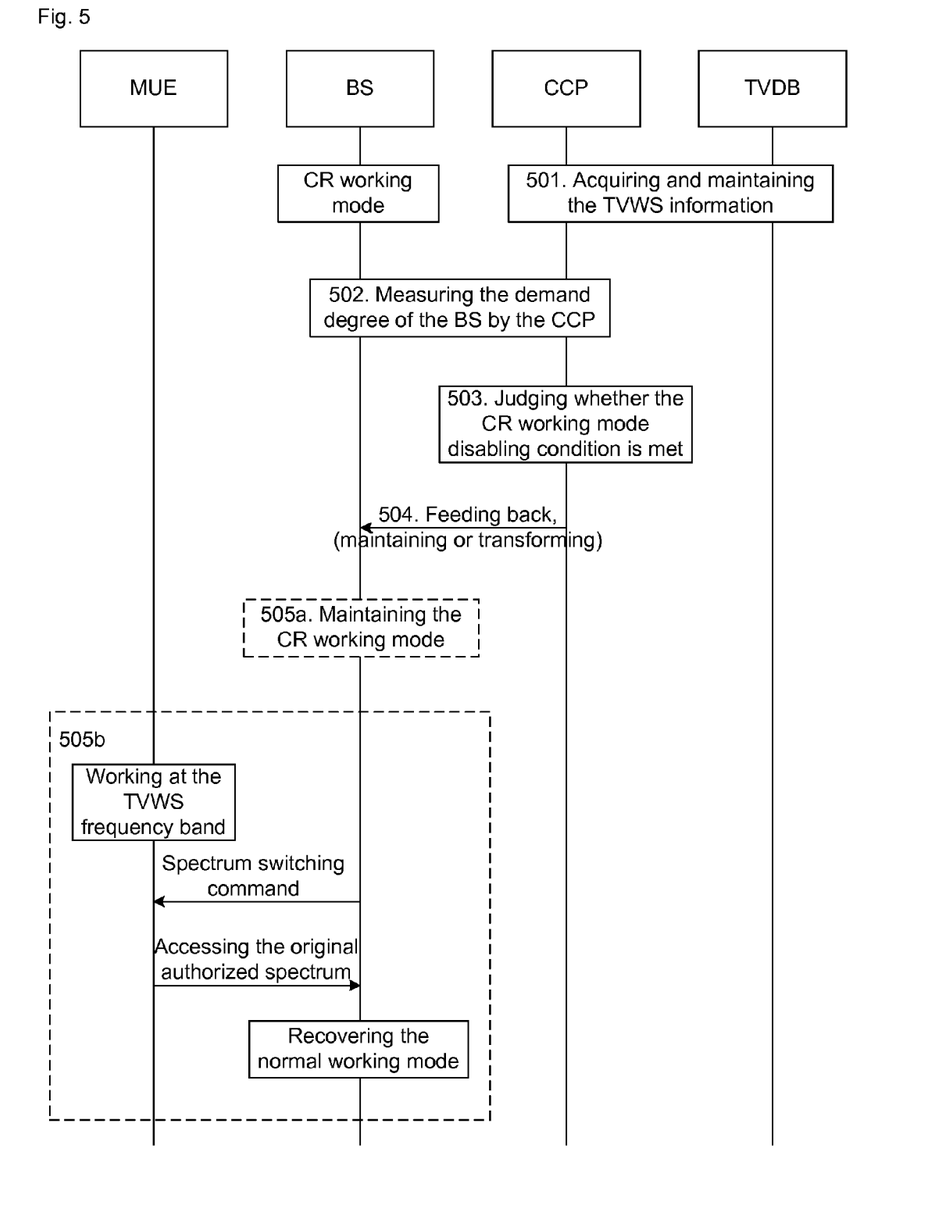
FIG. 5 shows a signalling disabling flow of a CR working mode of the disclosure.

As shown in FIG. 5, the method for disabling a CR working mode of a CR system of the embodiment is specially described below.

Step 501: in the CR working mode, the CCP acquires and maintains TVWS information;

the manner of acquiring and maintaining TVWS information by the CCP can be: accessing the TVDB periodically or as required, or notifying the CCP by the TVDB when TVWS information changes; and in addition, the CCP stores information about TVWS utilization situation of the system at the same time. The operation is performed all the time during the normal operation of the CCP, so that the CCP allocates TVWS spectrum resources which are indeed available currently to the BS when the subordinate BS is in the CR working mode.

Step 502: the CCP measures the demand degree of the BS on the borrowed spectrum;

The parameters for the CCP to measure the demand degree of the BS can be the traffic and the communication quality of the cell where the BS is located, and other parameters which can represent the demand degree of the communication cell on the borrowed spectrum.

Step 503: the CCP judges whether to disable the CR working mode by comparing a demand degree measurement result and a preset CR working mode enabling condition of the system;

when the CCP measures the demand degree of the cell on the borrowed spectrum by the traffic, the CR working mode disabling condition is the upper limit of the remaining capacity threshold value interval, and can be set as the absolute value of the system remaining capacity (for example, the remaining bandwidth is 200 kHz) or the relative value of the system remaining capacity to the system capacity (for example, the system remaining capacity occupies 20% of the system capacity) and the like. When the absolute value of the current system remaining capacity or the relative value of the system remaining capacity to the system capacity is greater than the upper limit of the preset remaining capacity threshold value, the base station disables the CR working mode. Under this condition, the traffic is used for measuring the current load state of the cell; the heavier the load is, the higher the demand degree is, and finally the demand degree of the cell on the borrowed spectrum is determined.

When the CCP takes the communication quality as the measurement parameter of the demand degree, the CR working mode enabling condition is the lower limit of the communication quality threshold value interval, and can be set as the call drop rate, the BER, the BLER and other parameters for measuring the communication quality of the cell (for example, the drop call rate is 0.05); and when the current call drop rate of the cell is higher than the set condition, the base station enables the CR working mode. Under this condition, the worse the communication quality is, the higher the demand degree is, and whether to disable the CR working mode is measured by the communication quality.

Step 504: the CCP feeds back a judgement result to the BS, wherein the judgement result comprises the command for maintaining the current working mode or transforming a working mode by the BS.

Step 505: the BS determines a working mode according to the command from the CCP, and executes a network accessing policy of the MUE in a corresponding mode.

505a: when the BS receives the command for maintaining the current working mode from the CCP, the BS maintains the CR working mode, and the newly entering MUE performs an operation according to the policy of 5b in the embodiment 1 of the method;

505b: when the BS receives the command for transforming a working mode from the CCP, the BS performs working mode transformation (if the current working mode is the CR working mode, the mode is transformed to the disabled CR working mode, and the normal working mode is recovered); the BS will send a spectrum switching command to the MUE which has accessed the TVWS spectrum in the region (the MUE is ordered to be switched to the system authorized spectrum), wherein the command includes and is not limited to a target spectrum and relative transmission parameters; the MUE is switched to access a specified frequency band after receiving the spectrum switching command; after all pieces of the MUE finish the switching and exit the TVWS spectrum, the BS ends the CR working mode, and recovers the normal working mode, and the newly entering MUE operates according to the policy of the 405a in the embodiment 1 of the method.

In order to implement the embodiment of the method, other embodiments of the disclosure further provide an apparatus for transforming a working mode in a CR system. In addition, the embodiment below is used for implementing the embodiments of the methods above, so that the modules in the apparatus for transforming a working mode in a CR system are arranged for implementing various steps of the methods above, but the disclosure is not limited to the embodiments below, and any apparatus and module for implementing the methods above should be included in the protection range of the disclosure. Moreover, in the description below, the contents, the same as those of the methods above, are omitted here to save space.

Figure 6:
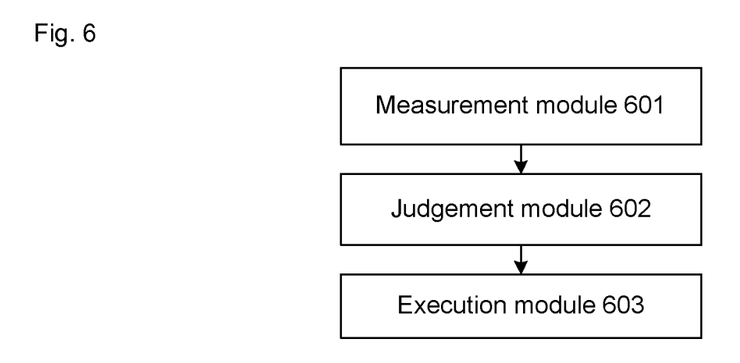
FIG. 6 shows a structural schematic diagram of an apparatus for transforming a working mode in a CR system of the disclosure.

FIG. 6 shows a structural schematic diagram of the apparatus for transforming a working mode in a CR system of the disclosure; and the apparatus comprises: a measurement module 601, a judgement 602 and an execution module 603;

the measurement module 601 is located on a network side and is configured to acquire and measure a demand degree of each subordinate cell on borrowed spectrum resources; and the demand degree of each subordinate cell on borrowed spectrum resources acquired by the measurement module is represented by the traffic or the communication quality of the cell;

the judgement module 602 is located on the network side and is configured to judge whether the demand degree of each subordinate cell on borrowed spectrum resources meets a condition for working mode transformation, and determine whether to perform working mode transformation on each cell according to a judgement result; and the working mode comprise a normal working mode and a CR working mode, wherein the CR working mode refers to a working mode of working at a system authorized spectrum and a borrowed spectrum at the same time, and the normal working mode refers to a working mode of working at a system authorized spectrum; and the execution module 603 is located on the base station and is configured to execute a network allocation policy of a mobile terminal in a corresponding working mode according to a determination result of the judgement module.

When the demand degree on borrowed spectrum resources is represented by the traffic of the cell, a remaining capacity threshold value interval for inhibiting the frequent transformation is set; and the condition for working mode transformation which the judgement module 602 depends on is that: when the absolute value of system remaining capacity or the relative value of the system remaining capacity to system capacity is greater than the upper limit of a corresponding preset remaining capacity threshold value interval, the CR working mode is transformed into the normal working mode; when the absolute value of the system remaining capacity or the relative value of the system remaining capacity to the system capacity is less than the lower limit of the corresponding preset remaining capacity threshold value interval, the normal working mode is transformed into the CR working mode.

When the demand degree on borrowed spectrum resources is represented by the communication quality, a communication quality threshold value interval is set; and the condition for working mode transformation that the judgement module 602 depends on is that: when the communication quality is less than the lower limit of the communication quality threshold value interval, the normal working mode is transformed into the CR working mode, and when the communication quality is greater than the upper limit of the communication quality threshold value interval, the CR working mode is transformed into the normal working mode.

The network allocation policy of the mobile terminal in the corresponding working mode executed by the execution module 603 specifically comprises:

when the CR working mode is transformed into the normal working mode, a base station instructs the mobile terminal which has accessed the borrowed spectrum in the region to switch to a system authorized spectrum, and a mobile terminal newly entering the subordinate cell will access the system authorized spectrum; and when transforming from the normal working mode into the CR working mode, the mobile terminal newly entering the subordinate cell accesses the borrowed spectrum preferentially after the CR working mode is enabled.

The above is only the preferred embodiment of the disclosure and not intended to limit the disclosure; and for those skilled in the art, the disclosure can have a plurality of modifications and improvements. Any modifications, equivalent replacements, improvements and the like within the spirit and principle of the disclosure shall fall within the scope of protection of the disclosure.

INDUSTRIAL APPLICABILITY

By the disclosure, the allocation of borrowed spectrum resources can be coordinated, and the abuse of the borrowed spectrum resources can be avoided; and a network side disables the CR working mode of a cell with the low demand degree, so that more borrowed spectrum resources are available to other cells having a higher demand degree, therefore, the overall performance of the system is improved.

The invention claimed is:

1. A method of transforming a working mode in a Cognitive Radio (CR) system, comprising:
acquiring, by a network side, parameters of traffic or communication quality of a subordinate cell of the network side, and measuring, by the network side, a demand degree of the subordinate cell on borrowed spectrum resources;
determining, by the network side, that the subordinate cell transforms a working mode when the demand degree of the subordinate cell on borrowed spectrum resources meets a condition for working mode transformation; and
notifying, by the network side, a base station to execute a network allocation policy of a mobile terminal in a corresponding working mode;
wherein the working mode comprise a normal working mode and a CR working mode, the CR working mode refers to a working mode of working at a system authorized spectrum and a borrowed spectrum at the same time and the normal working mode refers to a working mode of working at a system authorized spectrum; and the working mode transformation comprises: transforming from the normal working mode to the CR working mode, or transforming from the CR working mode to the normal working mode;
wherein the executing a network allocation policy of a mobile terminal in a corresponding working mode by the base station comprises: when the CR working mode is transformed into the normal working mode, the base station commands a mobile terminal which has accessed a borrowed spectrum to switch to an authorized spectrum of the system, and a mobile terminal newly entering the subordinate cell accesses an authorized spectrum of the system; and
when the normal working mode is transformed into the CR working mode, after the CR working mode is enabled, the base station applies for the borrowed spectrum and allocates the borrowed spectrum to an access link between a mobile terminal newly entering the subordinate cell and the base station, the mobile terminal newly entering the subordinate cell preferentially access the borrowed spectrum, and the mobile terminal which has accessed the authorized spectrum still uses the authorized spectrum.

2. The method according to claim 1, wherein
the demand degree of the subordinate cell on borrowed spectrum resources is represented by traffic and communication quality of the subordinate cell; the traffic is used for measuring a current state of a load of the subordinate cell, the heavier the load is, the higher the demand degree of the subordinate cell on borrowed spectrum resources is; and the parameters of communication quality can be set as a call drop rate, a BER, a BLER and other parameters for measuring the communication quality of the subordinate cell, the worse the communication quality is, the higher the demand degree of the subordinate cell on borrowed spectrum resources is.

3. The method according to claim 2, wherein the condition for working mode transformation refers to:
a condition required to be met by the demand degree on borrowed spectrum resources when the subordinate cell or the base station is to transform from a normal working mode to a CR working mode; or
a condition required to be met by the demand degree on borrowed spectrum resources when the subordinate cell or the base station is to transform from a CR working mode to a normal working mode.

4. The method according to claim 3, wherein when the demand degree of the subordinate cell on borrowed spectrum resources is represented by the traffic of the subordinate cell, measuring the demand degree of the subordinate cell on borrowed spectrum resources refers to: counting traffic of the subordinate cell in a time period to obtain an absolute value of system remaining capacity or a relative value of the system remaining capacity to system capacity; and judging, by the network side, whether the demand degree of the subordinate cell on borrowed spectrum resources meets a condition for working mode transformation refers to: setting a system remaining capacity threshold value interval; and when an absolute value of the system remaining capacity or the relative value of the system remaining capacity to the system capacity is greater than an upper limit of a corresponding preset system remaining capacity threshold value interval, transforming from the CR working mode into the normal working mode; and when the absolute value of the system remaining capacity or the relative value of the system remaining capacity to the system capacity is less than a lower limit of a corresponding preset system remaining capacity threshold value interval, transforming from the normal working mode into the CR working mode.

5. The method according to claim 3, wherein when the demand degree of the subordinate cell on borrowed spectrum resources is represented by the communication quality, measuring the demand degree of the subordinate cell on borrowed spectrum resources refers to: counting the parameters of communication quality of the subordinate cell in a time period; and judging, by the network side, whether the demand degree of the subordinate cell on borrowed spectrum resources meets a condition for working mode transformation refers to: setting a communication quality threshold value interval; and when the communication quality is less than a lower limit of the communication quality threshold value interval, transforming from the normal working mode into the CR working mode; and when the communication quality is greater than an upper limit of the communication quality threshold value interval, transforming from the CR working mode into the normal working mode.

6. The method according to claim 1, wherein when the demand degree of the subordinate cell on borrowed spectrum resources is represented by the traffic of the subordinate cell, measuring the demand degree of the subordinate cell on borrowed spectrum resources refers to: counting traffic of the subordinate cell in a time period to obtain an absolute value of system remaining capacity or a relative value of the system remaining capacity to system capacity; and judging, by the network side, whether the demand degree of the subordinate cell on borrowed spectrum resources meets a condition for working mode transformation refers to: setting a system remaining capacity threshold value interval; and when an absolute value of the system remaining capacity or the relative value of the system remaining capacity to the system capacity is greater than an upper limit of a corresponding preset system remaining capacity threshold value interval, transforming from the CR working mode into the normal working mode; and when the absolute value of the system remaining capacity or the relative value of the system remaining capacity to the system capacity is less than a lower limit of a corresponding preset system remaining capacity threshold value interval, transforming from the normal working mode into the CR working mode.

7. The method according to claim 1, wherein when the demand degree of the subordinate cell on borrowed spectrum resources is represented by the communication quality, measuring the demand degree of the subordinate cell on borrowed spectrum resources refers to: counting the parameters of communication quality of the subordinate cell in a time period; and judging, by the network side, whether the demand degree of the subordinate cell on borrowed spectrum resources meets a condition for working mode transformation refers to: setting a communication quality threshold value interval; and when the communication quality is less than a lower limit of the communication quality threshold value interval, transforming from the normal working mode into the CR working mode; and when the communication quality is greater than an upper limit of the communication quality threshold value interval, transforming from the CR working mode into the normal working mode.

8. An apparatus for transforming a working mode in a Cognitive Radio (CR) system, comprising:
at least one processor; and
a memory coupled to the at least one processor,
wherein the at least one processor is configured:
to acquire parameters of traffic or communication quality of a subordinate cell and measure a demand degree of the subordinate cell on borrowed spectrum resources;
to determine that the subordinate cell transforms a working mode when the demand degree of the subordinate cell on borrowed spectrum resources meets a condition for working mode transformation; and
to execute a network allocation policy of a mobile terminal in a corresponding working mode;
wherein the processor is further configured to judge whether the subordinate cell meets the condition for working mode transformation,
the working mode comprises a normal working mode and a CR working mode, wherein the CR working mode refers to a working mode of working at a system authorized spectrum and a borrowed spectrum at the same time, and the normal working mode refers to a working mode of working at a system authorized spectrum; and the working mode transformation comprises: transforming from the normal working mode to the CR working mode, or transforming from the CR working mode to the normal working mode;
wherein the processor is configured to execute the network allocation policy of the mobile terminal in the corresponding working mode, comprises: when the CR working mode is transformed into the normal working mode, a base station commands a mobile terminal which has accessed a borrowed spectrum in a region to switch to an authorized spectrum of the system, and a mobile terminal newly entering the subordinate cell accesses an authorized spectrum of the system; and
when the normal working mode is transformed into the CR working mode, after the CR working mode is enabled, the base station applies for the borrowed spectrum and allocates the borrowed spectrum to an access link between a mobile terminal newly entering the subordinate cell and the base station, the mobile terminal newly entering the subordinate cell preferentially accesses the borrowed spectrum, and the mobile terminal which has accessed the authorized spectrum still uses the authorized spectrum.

9. The apparatus according to claim 8, wherein the demand degree of the subordinate cell on borrowed spectrum resources acquired by the measurement module is represented by traffic or communication quality of the subordinate cell; the traffic is used for measuring a current state of a load of the subordinate cell, the heavier the load is, the higher the demand degree of the subordinate cell on borrowed spectrum resources is; and the parameters of communication quality can be set as a call drop rate, a BER, a BLER and other parameters for measuring the communication quality of the subordinate cell, the worse the communication quality is, the higher the demand degree of the subordinate cell on borrowed spectrum resources is.

10. The apparatus according to claim 8, wherein the condition for working mode transformation refers to:
a condition required to be met by the demand degree on borrowed spectrum resources when the subordinate cell or a base station is to transform from a normal working node to a CR working mode; or
a condition required to be met by the demand degree on borrowed spectrum resources when the subordinate cell or the base station is to transform from a CR working node to a normal working mode.

11. The apparatus according to claim 10, wherein when the demand degree of the subordinate cell on borrowed spectrum resources is represented by the traffic of the subordinate cell, measuring by the measurement module the demand degree of the subordinate cell on borrowed spectrum resources refers to: counting traffic of the subordinate cell in a time period to obtain an absolute value of system remaining capacity or a relative value of the system remaining capacity to system capacity; and judging by the judgement module whether the demand degree of the subordinate cell on borrowed spectrum resources meets a condition for working mode transformation refers to: setting a system remaining capacity threshold value interval; and when the absolute value of the system remaining capacity or the relative value of the system remaining capacity to the system capacity is greater than an upper limit of a corresponding preset system remaining capacity threshold value interval, transforming from the CR working mode into the normal working mode; and when the absolute value of the system remaining capacity or the relative value of the system remaining capacity to the system capacity is less than a lower limit of a corresponding preset system remaining capacity threshold value interval, transforming from the normal working mode into the CR working mode.

12. The apparatus according to claim 10, wherein when the demand degree of the subordinate cell on borrowed spectrum resources is represented by the communication quality, measuring by the measurement module the demand degree of the subordinate cell on borrowed spectrum resources refers to: counting the parameters of communication quality of the subordinate cell in a time period; and judging by the judgement module whether the demand degree of the subordinate cell on borrowed spectrum resources meets a condition for working mode transformation refers to: setting a communication quality threshold value interval; when the communication quality is less than a lower limit of the communication quality threshold value interval, transforming from the normal working mode into the CR working mode; and when the communication quality is greater than an upper limit of the communication quality threshold value interval, transforming from the CR working mode into the normal working mode.

13. The apparatus according to claim 8, wherein when the demand degree of the subordinate cell on borrowed spectrum resources is represented by the traffic of the subordinate cell, measuring by he measurement module the demand degree of the subordinate cell on borrowed spectrum resources refers to: counting traffic of the subordinate cell in a time period to obtain an absolute value of system remaining capacity or a relative value of the system remaining capacity to system capacity; and judging by the judgement module whether the demand degree of the subordinate cell on borrowed spectrum resources meets a condition for working mode transformation refers to: setting a system remaining capacity threshold value interval; and when the absolute value of the system remaining capacity or the relative value of the system remaining capacity to the system capacity is greater than an upper limit of a corresponding preset system remaining capacity threshold value interval, transforming from the CR working mode into the normal working mode; and when the absolute value of the system remaining capacity or the relative value of the system remaining capacity to the system capacity is less than a lower limit of a corresponding preset system remaining capacity threshold value interval, transforming from the normal working mode into the CR working mode.

14. The apparatus according to claim 8, wherein when the demand degree of the subordinate cell on borrowed spectrum resources is represented by the communication quality, measuring by the measurement module the demand degree of the subordinate cell on borrowed spectrum resources refers to: counting the parameters of communication quality of the subordinate cell in a time period; and judging by the judgement module whether the demand degree of the subordinate cell on borrowed spectrum resources meets a condition for working mode transformation refers to: setting a communication quality threshold value interval; when the communication quality is less than a lower limit of the communication quality threshold value interval, transforming from the normal working mode into the CR working mode; and when the communication quality is greater than an upper limit of the communication quality threshold value interval, transforming from the CR working mode into the normal working mode.

* * * * *